(12) United States Patent
Hoare et al.

(10) Patent No.: US 11,142,201 B2
(45) Date of Patent: Oct. 12, 2021

(54) VEHICLE LAUNCH CONTROL SYSTEM

(71) Applicant: JAGUAR LAND ROVER LIMITED, Coventry (GB)

(72) Inventors: Edward Hoare, Warwickshire (GB); Thuy-Yung Tran, Warwickshire (GB); Aleksandr Bystrov, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 2 days.

(21) Appl. No.: 16/316,291

(22) PCT Filed: Jun. 2, 2017

(86) PCT No.: PCT/EP2017/063472
§ 371 (c)(1),
(2) Date: Jan. 8, 2019

(87) PCT Pub. No.: WO2018/007080
PCT Pub. Date: Jan. 11, 2018

(65) Prior Publication Data
US 2020/0180627 A1   Jun. 11, 2020

(30) Foreign Application Priority Data

Jul. 8, 2016 (GB) .................................. 1611915

(51) Int. Cl.
*B60W 30/18* (2012.01)
*B60W 40/064* (2012.01)
*B60K 28/16* (2006.01)

(52) U.S. Cl.
CPC ... *B60W 30/18027* (2013.01); *B60W 2520/26* (2013.01); *B60W 2552/35* (2020.02); *B60W 2710/105* (2013.01)

(58) Field of Classification Search
USPC .......................................................... 701/87
See application file for complete search history.

(56) References Cited

U.S. PATENT DOCUMENTS

2013/0085642 A1* 4/2013 Bankers ................. G06K 9/605
                                                               701/48
2014/0195112 A1* 7/2014 Lu ....................... B60G 17/0165
                                                               701/37

(Continued)

FOREIGN PATENT DOCUMENTS

DE     102005004394     8/2006
EP        2479362       7/2012

(Continued)

OTHER PUBLICATIONS

Search and Examination Report, GB1611915.8, dated Dec. 20, 2016, 7 pp.

(Continued)

*Primary Examiner* — Tyler D Paige
(74) *Attorney, Agent, or Firm* — McCoy Russell LLP (57) ABSTRACT

A vehicle launch control system for a vehicle (10) comprising an input for receiving an indication signal to indicate that vehicle launch is imminent; a sensor system (12, 22) configured to determine a terrain characteristic of the terrain in the path of the vehicle if the indication signal is received; and a processing module (33) configured to determine whether the terrain characteristic is likely to result in an unwanted level of wheel slip if the vehicle is launched, wherein the processing module (33) is further configured to provide an output to indicate that an unwanted level of wheel slip will occur based on the outcome of the determination.

20 Claims, 5 Drawing Sheets

(56) References Cited

U.S. PATENT DOCUMENTS

| | | | |
|---|---|---|---|
| 2015/0073674 A1* | 3/2015 | Kelly | B60W 10/184 701/69 |
| 2015/0073679 A1 | 3/2015 | Darnell et al. | |
| 2016/0082972 A1* | 3/2016 | Fairgrieve | B60W 10/184 701/84 |
| 2018/0012490 A1* | 1/2018 | Jodorkovsky | G08G 1/096775 |
| 2018/0345973 A1* | 12/2018 | Krueger | B60W 10/06 |
| 2020/0089247 A1* | 3/2020 | Shkurti | G05D 1/0257 |

FOREIGN PATENT DOCUMENTS

| | | |
|---|---|---|
| GB | 2454336 | 5/2009 |
| GB | 2516535 | 1/2015 |
| GB | 2523096 | 8/2015 |
| WO | 2013131522 | 9/2013 |

OTHER PUBLICATIONS

International Search Report and Written Opinion, PCT/EP2017/063472, dated Jul. 17, 2017, 14 pp.

\* cited by examiner

VEHICLE LAUNCH CONTROL SYSTEM

CROSS-REFERENCE TO RELATED APPLICATIONS

This application is a 371 of International Application No. PCT/EP2017/063472, filed Jun. 2, 2017, which claims priority to GB Patent Application 1611915.8 filed Jul. 8, 2016, the contents of both of which are incorporated by reference herein in their entirety.

FIELD OF THE INVENTION

The present invention relates to a system for use in a vehicle and in particular to a system that enables a vehicle to determine an indication of a characteristic of the terrain in the path of the vehicle and to react accordingly. Aspects of the invention relate to a vehicle launch control system, a method for use in a vehicle, and to a vehicle itself.

BACKGROUND

Many modern vehicles are fitted with systems (anti-lock braking, traction control, electronically controlled locking differentials, adjustable ride height etc.) designed to improve capability of the vehicle and the riding experience for the users. The riding experience could be a measure of, for example, comfort or vehicle composure, and the setup of the systems of a vehicle to optimise the riding experience may be dependent on the type of terrain over which the vehicle travels. Current systems with defined system settings for a plurality of different terrain types can be manually set to a terrain type by a user, or may use sensors to determine characteristics about the terrain over which a vehicle is travelling, and then select the most appropriate setting. Such a system is described in GB2492655. However, the determination of a terrain type by examining vehicle parameters using on-board systems provides a reactive solution to the terrain over which the vehicle is currently travelling and as such does not allow the vehicle to prepare in advance for the terrain over which it is about to travel without user-input. A particular problem exists when a vehicle is parked for a period of time, and where the environment around the vehicle changes between the vehicle being parked and the vehicle being re-launched. For example, if a vehicle is parked in a relatively dry field during the day and heavy rain results in the terrain surrounding the vehicle becoming water-logged overnight, when the vehicle is launched in the morning it may not be in a configuration optimised for launch on the now water-logged surface.

One object of the present invention is to provide a system for use in a vehicle that is able to determine certain characteristics relating to the surface or terrain around the vehicle addressing the disadvantages of existing systems.

STATEMENTS OF INVENTION

According to one aspect of the invention, there is provided a vehicle launch control system for a vehicle, the system comprising a sensor system comprising one or more vehicle-mounted sensors configured to receive a reflected signal from the terrain in the path of the vehicle, an input for receiving an indication signal to indicate that vehicle launch is imminent and being operable to automatically instruct the sensor system to determine a terrain characteristic of the terrain in the path of the vehicle if the indication signal is received; the system further configured to, in dependence on said terrain characteristic, determine whether the terrain characteristic is likely to result in an unwanted level of wheel slip if the vehicle is launched, and to provide an output to indicate that an unwanted level of wheel slip will occur based on the outcome of the determination.

Optionally the system may comprise said sensor system.

For the purpose of this specification it will be appreciated that reference to 'the terrain in the path of the vehicle' includes the surface over which the vehicle is about to travel in front of, behind or underneath the vehicle.

Reference to "vehicle launch" is intended to mean the first few moments of vehicle movement from rest and, typically, the first few seconds after a vehicle pulls away from a rest position.

The invention provides the benefit that if the driver is unaware of the change in conditions surrounding the vehicle at start-up, or is an inexperienced driver not familiar with launching a vehicle in difficult terrain conditions, control of the vehicle is automatically improved and wheel slip and/or damage to the underlying terrain is avoided.

The system may comprise an electronic processor having an electrical input for receiving said indication signal and an electronic memory device electrically coupled to the electronic processor and having instructions stored therein wherein said electronic processor is configured to access the memory device and execute the instructions stored therein such that it is operable to instruct said sensor system to determine said terrain characteristic. The processor may also be configured to access the memory device and execute the instructions stored therein such that it is operable in dependence on said determined terrain characteristic, to determine whether the terrain characteristic is likely to result in an unwanted level of wheel slip if the vehicle is launched, and to provide said output based on the outcome of the determination The system may further comprise an input for receiving a driver-demanded torque to initiate launch of the vehicle. Typically, the driver-demanded torque may be derived from an input in the form of an accelerator pedal, a twist-grip accelerator, a SET+/−speed selector control or any other suitable user interface means by which a user demands torque.

In another embodiment the system comprises an input for receiving a control signal from a speed control system associated with the vehicle to initiate vehicle launch.

In one embodiment, the system is configured to provide the output to a torque control system for providing a torque demand to a powertrain of the vehicle depending on the output.

By way of example, the torque control system may be configured to modify a demanded torque in response to receiving the output to indicate the unwanted level of wheel slip.

In one embodiment, the modification may comprise overriding the demanded torque with a torque which avoids wheel slip for the determined terrain characteristic at vehicle launch.

In another embodiment, the modification may comprise altering the demanded torque to a lower value.

Alternatively, the modification may comprise applying a maximum limit to the demanded torque so as to avoid wheel slip for the determined terrain characteristic at vehicle launch.

In another example, the modification may comprise modifying the rate of increase in the torque applied at the driven wheels compared with the rate of increase in the demanded torque.

The terrain characteristic may include a characterisation of the friction of the surface. Alternatively, the terrain characteristic may include a characterisation of the deformability of the surface. In another example, the terrain characteristic may include a characterisation of the water content of the surface or the roughness of the surface.

In one embodiment, the sensor system may include one or more vehicle-mounted sensors configured to receive a reflected signal from the terrain in the path of the vehicle.

The sensor system may include at least two sensors mounted on the vehicle, including at least one acoustic sensor.

Alternatively, the terrain characteristic may be derived from at least two sensors mounted on the vehicle, including at least one radar sensor.

Reference to a "vehicle-mounted sensor" includes the use of a portable sensing device carried in the vehicle temporarily.

In another embodiment, radar and acoustic sensors may be used. The combination of sensor output data from both a radar sensor and an acoustic sensor can result in greater distinction between the characteristics of parameters relating to sensor output data for certain terrain types in which parameters relating to sensor output data are poorly distinguished by use of one type of sensor only. In addition, radar and acoustic sensors are not affected by different weather conditions.

In one embodiment, the terrain characteristic may be verified by from a user-input of the terrain type. For example, the vehicle may include a human machine interface configured to enable user-input in relation to the terrain characteristic following a determination of by the user (e.g. by observation). In this embodiment there is no need for additional sensors on the vehicle to provide an indication of the terrain characteristic, and instead a manual input from the user (e.g. through a keyboard, a touchscreen, or dial on a human machine interface in the vehicle cabin or through an audio input) may be used to provide the required terrain indicator to the system.

The vehicle launch control system may include, in one embodiment, a launch detection module configured to determine whether the vehicle is about to launch so that the torque control process may be implemented at an appropriate time.

The launch detection module may be configured to receive a signal from a detection system to detect whether a key for the vehicle is present in the vehicle cabin. Additionally or alternatively, the launch detection module may be configured to receive a signal from a detection system arranged to detect the presence of an occupant in the vehicle cabin.

Additionally or alternatively, the launch detection module may be configured to receive a signal from a vehicle powertrain indicative of a running condition of that the vehicle powertrain.

In addition, or alternatively, the launch detection module may be configured to receive a signal from a brake system of the vehicle to indicate that the brake has been released ready for vehicle launch.

The vehicle launch control system may further include an input for receiving an indication from a tow sensor relating to whether the vehicle is towing a trailer, and wherein the system being further configured to provide the modified torque control signal based also on the indication from the tow sensor.

The vehicle launch control system may further comprise an input for receiving an indication from a load sensor measuring the load over the driven wheels, and wherein the system being further configured to provide the modified torque control signal based also on the indication from the load sensor.

It will be appreciated that reference to a terrain characteristic may be a feature of the terrain (such as the friction of the surface, the deformability, or the water content) but may also include a complete characterisation to identify the type (e.g. grass or snow).

According to another aspect of the invention, there is provided a vehicle launch control system for a vehicle comprising an input for receiving a indication signal to indicate that vehicle launch is imminent; an input for receiving a terrain characteristic of the terrain in the path of the vehicle if the indication signal is received; and a processing module configured to determine whether the terrain characteristic is likely to result in an unwanted level of wheel slip if the vehicle is launched, wherein the processing module is further configured to provide a modified torque output to the driven wheels of the vehicle in the event that an unwanted level of wheel slip will occur if the vehicle is launched.

Reference to 'modified' in this respect should be taken to mean any adaptation, limitation or replacement of the driver-demanded torque by a torque consistent with providing a controlled vehicle launch on a terrain having the identified terrain characteristic(s).

In this aspect of the invention, the indicator of the terrain characteristic may be derived from a user-input of the terrain characteristic, rather than from a sensor system forming part of the vehicle.

According to another aspect of the invention, there is provided a method of controlling launch of a vehicle comprising receiving an indication signal to indicate that vehicle launch is imminent; determining, on the basis of sensor output data measuring a reflected signal from the terrain in the path of the vehicle, a terrain characteristic of the terrain in the path of the vehicle at vehicle launch if the indication signal is received; determining whether the terrain characteristic is likely to result in an unwanted level of wheel slip if the vehicle is about to launch; and providing an output to indicate that an unwanted level of wheel slip will occur based on the outcome of the determination.

According to another aspect of the invention, there is provided a computer program product executable on a processor so as to implement the method of the invention.

According to another aspect of the invention, there is provided a non-transitory computer readable medium carrying computer readable code which when executed causes a vehicle to carry out the method of the invention.

According to another aspect of the invention, there is provided a controller arranged to implement the method of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible. Optional or preferred features of one aspect of the invention may be provided in any other aspect of the invention also.

BRIEF DESCRIPTION OF DRAWINGS

The invention will now be described, by way of example only, with reference to the accompanying figures in which.

DETAILED DESCRIPTION

Figure 1:
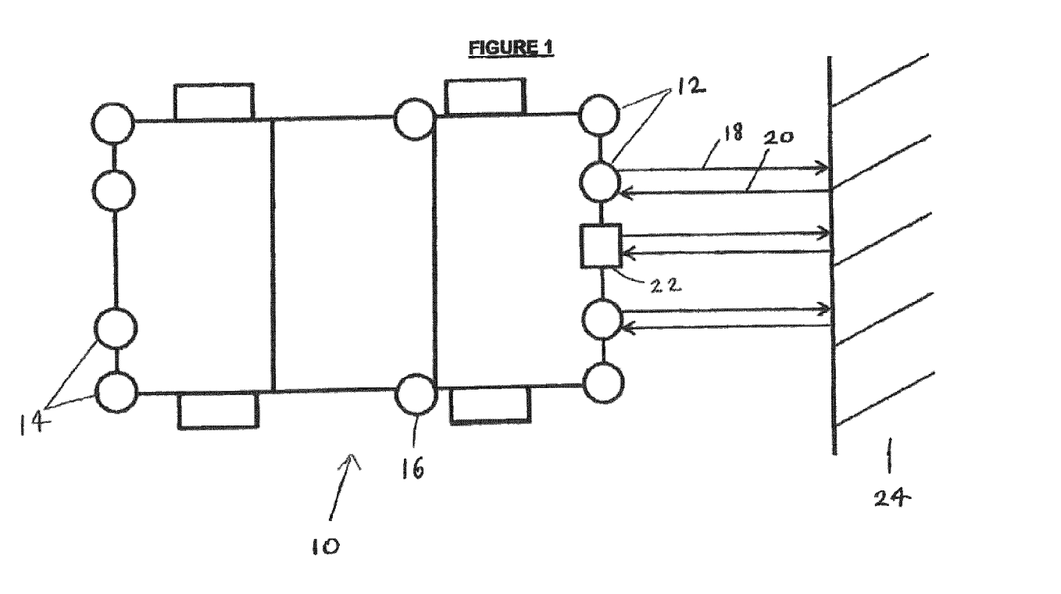
FIG. 1 is an overhead view of a vehicle and of terrain in the path of the vehicle.

In one embodiment of the present invention, data relating to the terrain in the path of a vehicle is collected from one or more sensors on a vehicle at the point at which the vehicle is about to be launched so that the torque applied to the driven wheels of the vehicle can be controlled accurately and carefully in dependence on the characteristics of the terrain. In this way, wheel slip can be effectively managed, mitigating against unnecessary erosion and damage of the terrain over which the vehicle is travelling which itself may further exacerbate problems for the driver at vehicle launch FIG. 1 shows one embodiment of a vehicle 10 with two different types of sensors that collect data to be input to different systems of the vehicle. In current systems, there may be acoustic transceivers or sensors positioned at the front 12, rear 14 and/or side 16 of the vehicle: commonly, acoustic sensors are used to send and receive acoustic signals to collect sensor output data to be input to, for example, parking assistance systems of the vehicle. The acoustic sensors may be ultrasound sensors.

Typically, parking assistance systems are used to warn a vehicle user, by visual and/or audible means, of the vehicle's proximity to an obstacle. In the case of an audible warning, a warning tone may sound with increasing frequency as the vehicle approaches the obstacle. The acoustic sensors used for parking assistance systems are typically able to detect obstacles at short-range (0.25-1.5 metres) but at a wide angle from the direction in which the sensor is pointed. The parking assistance system may transmit acoustic pulses 18 and then receive back any reflected signal 20 from an obstacle, which may then be processed to calculate the distance between the vehicle and the obstacle.

Also in current systems, there may be a radar transceiver or sensor 22 positioned at the front of the vehicle 10: commonly, radar sensors are used to send and receive radar signals to collect sensor output data to be input to, for example, adaptive cruise control (ACC) systems. In an ACC system, the time between a radar signal being sent and then received back is measured, and then the time interval to a vehicle in front is calculated. This information is sent to other systems of the vehicle (powertrain control, brake control etc.) and the necessary action is taken to maintain a constant time interval to the vehicle in front. The radar sensors in an ACC system are typically able to detect an obstacle up to about 150 metres ahead of the vehicle but at a narrow angle from the direction in which the sensor is pointed; other ACC systems may use shorter range, wider angle radars, or a combination of both.

FIG. 1 shows the terrain 24 in the path of the vehicle and in the example shown, the vehicle is travelling forwards and the terrain 24 shown is in front of the vehicle. It will be appreciated, that radar sensors may be positioned at other locations on and around the vehicle to collect sensor output data to be input to, for example, blind spot detection (BSD) systems, lane departure warning systems, or external radar signal detector systems (none of which are shown). In this way, the vehicle may be configured to use radar signals to determine surface characteristics of the terrain both in front of—and behind the vehicle, or underneath the vehicle, so as to cover at least a significant proportion of the area surrounding the vehicle and in particular, the area prescribed by potential paths that the vehicle may take depending on direction of travel and steering angle.

Figure 2:
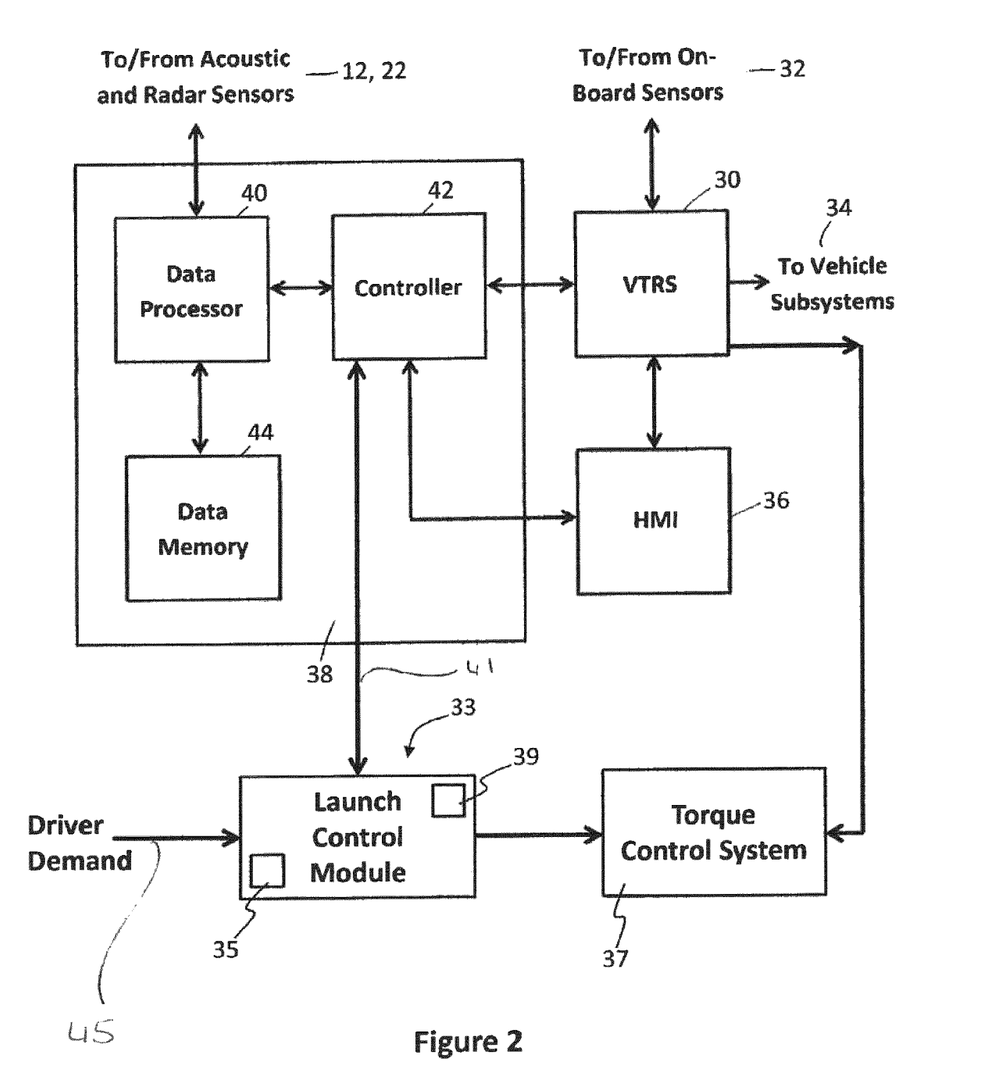
FIG. 2 is a diagram showing the component parts of a vehicle control system (VCS), together with the inputs to, and outputs from, the VCS and various modules for processing data.

Referring to FIG. 2, in some current vehicles a vehicle system is configured to improve the capability of the vehicle and the riding experience for the vehicle user; for example, a vehicle control system (VCS) in the form of a vehicle terrain response system (VTRS) 30, such as a Terrain Response® system, receives sensor output data from one or more on-board sensors 32 (such as a wheel speed sensor, tyre pressure sensor, vehicle speed sensor, brake pedal position sensor, suspension articulation, acceleration, wheel slip, pitch rate, and yaw rate) relating to the terrain over which the vehicle 10 is currently travelling, processes the data, and sends signals to one or more vehicle subsystems 34 including, but not limited to, a suspension system, traction-control system, stability-control system, a ride height system, and a powertrain control system 37, so as to allow adjustment of the setup of the vehicle 10 accordingly. An example of a suitable vehicle terrain response system (VTRS) 30 is described in GB2492655. In an engine driven vehicle, for example, the power control system is an engine torque control system 37.

In one embodiment of the present invention, the VCS 38 includes a data processor 40 that receives sensor output data from the acoustic and radar sensors 12, 22; a VCS controller 42 for sending and receiving signals to and from the HMI 36 and/or VTRS 30; and a data memory 44 for storing acoustic and radar sensor output data.

The controller 42 of the VCS 38 also send signals to a launch control module 33 comprising various processing modules. The launch control module 33 also includes a first input for receiving, from the controller 42, a signal 41 representative of the terrain type or terrain characterisation in the path of the vehicle, as determined by the controller 42, and a second input for receiving a driver-demanded torque request signal 45 representing the torque which the driver demands to be applied to the driven wheels of the vehicle. In the case of a vehicle at rest, and which is about to launch, the driver demand received at the second input is the torque demanded by the driver in order to cause the vehicle to pull away from rest.

A first processing module in the form of a launch detection module 35 is configured to determine whether the vehicle is about to launch based on signals (not shown) received from one or more vehicle sub-systems, as will be described later. A second processing module 39, in the form of a determination module, is configured to determine whether, in response to the terrain type indication received from the controller 42, the driver demanded torque requires modification so as to avoid unwanted wheel slip.

The launch control module 33 communicates with the engine torque control system 37 in a manner dependent on the result of the output from the determination module 39, as will be described in further detail later.

The controller 42 of the VCS 38 also communicates with a human machine interface (HMI) 36 which incorporates a display within the vehicle cabin. Via the HMI display, the user receives alerts or advice, relating to a host of vehicle systems, for example, satellite navigation or in-vehicle entertainment systems. The HMI 36 typically includes a touch-screen keyboard, dial, or voice activation to enable user selection of a particular input for the various vehicle systems which can be controlled. In one embodiment of the present invention, the HMI 36 includes a means to allow the user to input an indication of the terrain type or terrain characteristic(s), based on their observations.

In use, in response to a user-input via the HMI 36, a control signal is sent via the controller 42 of the VTRS 30 to the one or more vehicle subsystems 34 to adjust the vehicle setup or configuration, according to the terrain type over which the vehicle is travelling. Alternatively, the VTRS 30 may adjust the vehicle setup automatically by sending a control signal to the vehicle subsystems 34 in response to the on-board sensor output data 32. The VTRS 30 may also send alerts to the vehicle user, via the HMI 36, to adjust his/her driving style (for example, to reduce the vehicle speed), according to the terrain type and/or characteristics of the surface over which the vehicle is travelling.

Details of how the configuration may be adjusted via the VTRS 30 and the process by which the various vehicle sub-systems are adjusted when the vehicle is travelling are described in UK patent application GB2492655. The VCS 38 determines an indication of the terrain in the path of the vehicle 10 using sensor output data that is collected in real-time for a plurality of different parameters relating to characteristics of the target terrain from the acoustic and radar sensors 12, 22. The VCS controller 42 then sends a control signal to either the VTRS 30 to adjust the vehicle setup accordingly, or the HMI 36 to prompt the user to input the determined terrain type to the VTRS 30. Here and throughout, the term "determine terrain type" should be interpreted to mean "makes a best estimation of the terrain type".

There now follows a description of how the outputs from the acoustic and radar sensors 12, 22 may be used to determine the terrain type or a characteristic of the terrain.

The data processor 40 of the VCS 38 receives sensor output data from both the acoustic and radar sensors 12, 22. The data processor 40 is responsible for associating the received sensor output data to a particular terrain type which it does by retrieving pre-determined information from the data memory 44 for comparison with the sensor output data. Upon determination of the terrain, the data processor 40 communicates with the VCS controller 42, which is responsible for sending control signals to the HMI 36 relating to the determined terrain type. It will be appreciated that, although the processor 40 and controller 42 are shown as independent components, they may comprise a single electronic controller.

It will be appreciated that any of the modules of the system in FIG. 2 may be provided in one and the same control unit or control system, or may be implemented in separate and independent processing modules, and that the illustration shown is used only to highlight the various different functions within the overall system capability.

Figure 3:
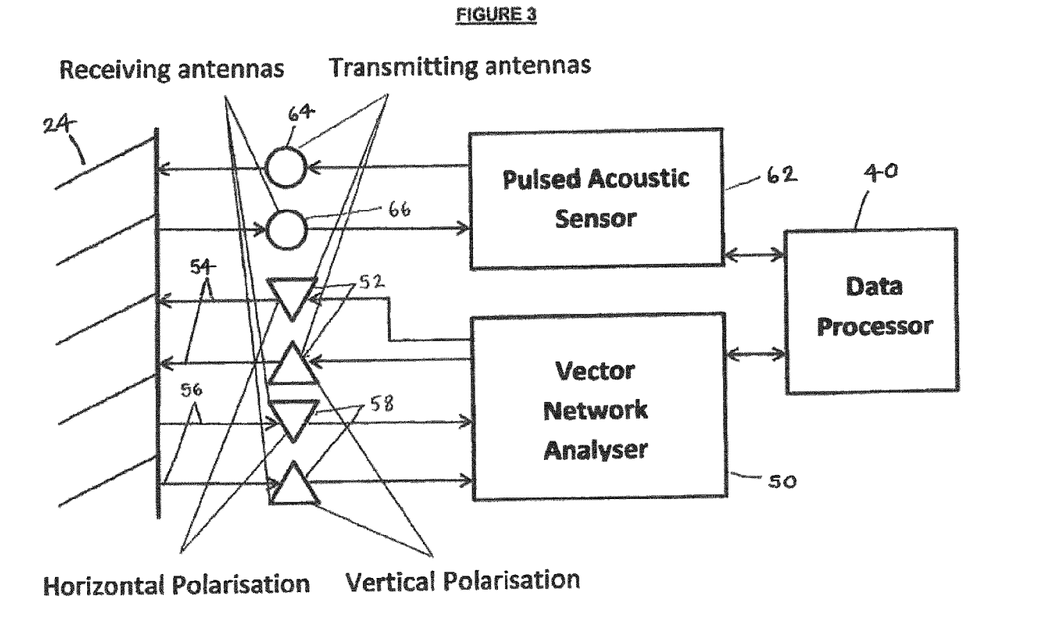
FIG. 3 is a diagram showing acoustic and radar sensors of the vehicle in FIG. 1.

FIG. 3 is a diagram showing the acoustic and radar sensors of the vehicle 10 in FIG. 1 and the data processor 40 for processing output signals from those sensors. In this embodiment, both radar and acoustic sensors 12, 22 are used to collect sensor output data relating to the terrain in the path of the vehicle 10. Both radar and acoustic sensor output data is used because data from one type of sensor may be advantageous over the other in certain situations.

In this embodiment, the radar signals are generated by a Vector Network Analyser (VNA) 50, transmitted at orthogonal (in particular, what may be defined as horizontal and vertical) polarisations by a pair of transmitting antennas 52, reflected by the terrain 24 in the path of the vehicle which alters the polarisation of the transmitted signals 54, and then the backscattered signals 56 are collected by a pair of receiving antennas 58 at orthogonal polarisations. For the purpose of this specification, reference to horizontal and vertical polarisations is referring to the vehicle when at rest on a level surface. Note that a VNA 50 is used by way of example only. It will be appreciated that a dedicated hardware sensor or sensor array may be used as may be desired for a given vehicle application. The radar sensor units may form part of the vehicle ACC system because of the similar operation and structure of the sensor units required for both purposes.

The radar sensors 22 may be used to characterise, for example, the roughness, wave absorption, or polarisation properties of a given terrain and, in particular, may be used to detect an area of low friction caused by, for example, water, ice, or wet grass. The roughness of a given terrain may be characterised, for example, using radar signals by analysing the backscattering properties of the wave at different polarisations. It is also possible to determine the water saturation level of a surface by analysing the backscattering properties of waves at different polarisations.

The radar signals 54, 56 may be transmitted and received at a plurality of different frequencies; however, for example, in the automotive industry the currently licensed bands for short-range radar are restricted to 21.65-26.65 GHz and 76-81 GHz. Note that other unlicensed frequency bands may also be considered.

The amplitude and phase of the received signals 56 are recorded by the VNA 50. These are then processed to obtain, for example, average signal powers, or reflection from a fixed area of terrain in the path of the vehicle.

At the point of vehicle manufacture, the VCS 38 goes through a calibration process whereby calibration data obtained from offline measurements is stored on the data memory 44 of the VCS 38 for use in a real-time determination process. Once calibrated, the VCS 38 is used to determine an indication of the terrain in the path of the vehicle 10 by analysing sensor output data and comparing this with the calibration data to determine the particular terrain type or terrain characteristic. In addition, as well as the real-time determination process, a real-time training or self-learning process may be implemented on the VCS 38.

The process by which the received signals may be analysed to provide an indication of terrain type is described in our co-pending published patent application GB252309.

With the ability to establish a characteristic of the terrain, the invention has benefits when combined with the launch control module 33 and the powertrain control system 37 as shown in FIG. 2. The invention has particular benefit when implemented on a vehicle which has been parked for a period of time during which the terrain conditions surrounding the vehicle may have changed in the time between the vehicle being parked and the vehicle being launched again, as will now be described.

Figure 4:
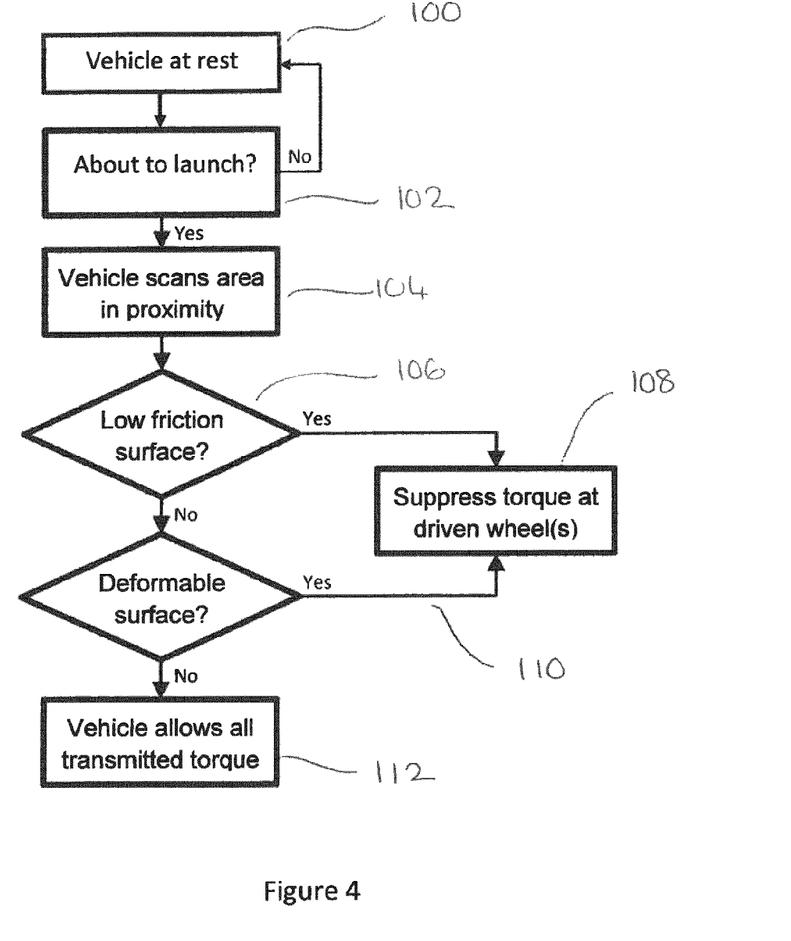
FIG. 4 is a flow diagram to illustrate the method steps for controlling the torque applied to the driven wheels of the vehicle, at vehicle launch, based on the output from the sensors in FIG. 2.

Referring to FIG. 4, the vehicle is initially at rest 100 having been parked on, for example, a grassy field. After a period of time (for example, overnight) the driver may return to the vehicle and 'key on' with the intention of launching the vehicle from the parking spot. At step 102 the first processing module 35 determines whether the vehicle is about to launch and generates an indication signal accordingly (as will be described further below). If it is determined that the vehicle is about to launch, various control systems on the vehicle are initialised including the radar and acoustic sensors 12, 22 on the front of the vehicle which are initialised at step 104. Upon initialisation, radar and acoustic signals are transmitted to and received by the sensors 12, 22, as described previously, allowing a determination of the terrain type to be made, or at least a determination of a surface characteristic (e.g. friction, deformability, water content) of the terrain.

If it is determined at step 106 that the terrain in the path of the vehicle (e.g. immediately in front of where the vehicle is parked) is a low friction surface, such as a water saturated or puddled surface (for example, due to rain fall overnight), there is a likelihood that undesirable wheel slip will occur if vehicle launch were to be performed with manual torque control, that is to say where the torque sent to the wheels is as a direct request of a driver demanded powertrain torque. At step 108 a signal is sent by the control module 33 to the engine torque control system 37 to modify or adapt the driver demanded torque to be applied to the vehicle wheels so as to minimise or avoid the risk of wheel slip in these conditions.

The torque demand signal for the torque to be applied to the vehicle wheels is determined from a driver input at the pedal or other suitable driver interface means, and in one embodiment the driver demanded torque signal is modified by limiting the torque applied at the wheels, regardless of the driver demand. In this way the vehicle has a controlled launch on the low friction or otherwise deformable surface, and excessive demand from the driver, which may otherwise cause wheel slip, is minimised or prevented.

It will be appreciated that the extent to which wheel slip is controlled may depend on the type of surface or terrain characteristic identified by the system and on which the vehicle is travelling, as it is known that in some circumstances, a degree of controlled wheel slip is desirable in order to maintain optimal progress of the vehicle on some surfaces.

One useful threshold may be surface friction. However, the threshold may be another threshold for another surface characteristic, e.g. deformability or water saturation or content of a particular surface.

In another embodiment, the system may be configured to provide a notification to the driver via the HMI that the torque intervention is recommended, and optionally together with a notification to impart to the driver the reason why the torque intervention is necessary (e.g. a warning message may be provided to state 'wet grass—torque intervention in progress' or 'slippery surface—automatic control initiated'). In existing vehicles, there is an option for the driver to override the VTRS and take manual control of the mode of operation of the vehicle. In this case the vehicle launch control system may be configured so as to provide a notification to the driver to alert the driver of the need for caution at vehicle launch, rather than adjusting the torque automatically. Notifications to the driver in this regard may be communicated via the HMI.

In the case where the driver has selected automatic control of the vehicle via the VTRS, at vehicle launch the control system may be configured to optimise automatically the torque applied to the driven wheels, in accordance with the characteristic(s) of the terrain that is detected in the path ahead of the vehicle, so that the torque applied is optimised as the vehicle pulls away, without the need for the driver to himself select the optimum control.

If the torque applied to the vehicle wheels is limited in this way, the limit may be applied only for a certain time period after he very start of launch (e.g. 5 seconds) or until the vehicle is travelling at a certain speed (e.g. 5 km/h). Once torque intervention has been established, it is possible to blend back into manual torque control appropriate to the relevant terrain surface.

In other embodiments the torque demand signal may be modified by altering the timing of the torque demand or the rate of increase of torque demand.

Figure 5:
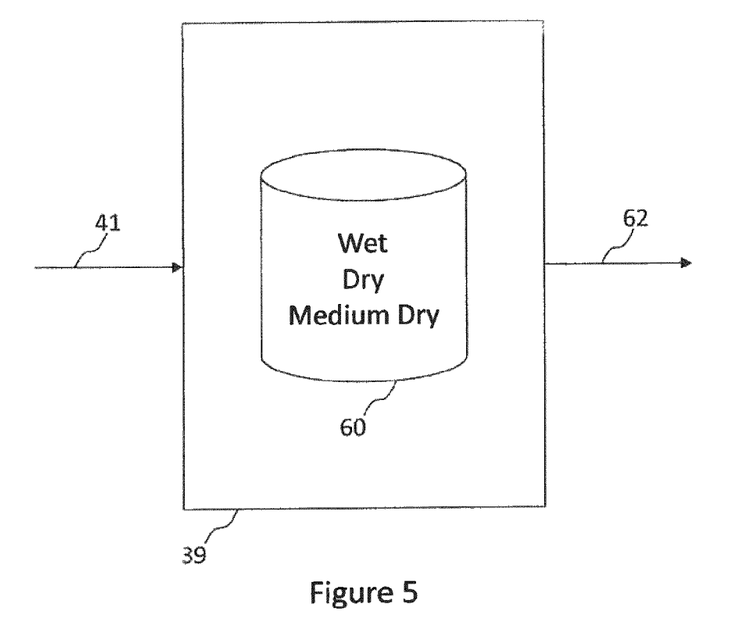
FIG. 5 is a schematic diagram of a processing module forming part of the vehicle control system in FIG. 2.

With reference to FIG. 5, one method will now be described by which a determination is made of the extent to which intervention or modification of the driver-demanded torque is required. The determination module 39 of the vehicle launch system is provided with a database 60 which contains pre-calibrated data relating to the properties of different surfaces e.g. wet, dry or medium dry. The determination module 39 receives the input 41 from the VCS 38 which provides an indication of the terrain type, and by comparison with the data stored in the database 60, determines the appropriate course of action based on the extent to which the terrain qualifies as being wet or dry.

Figure 6:
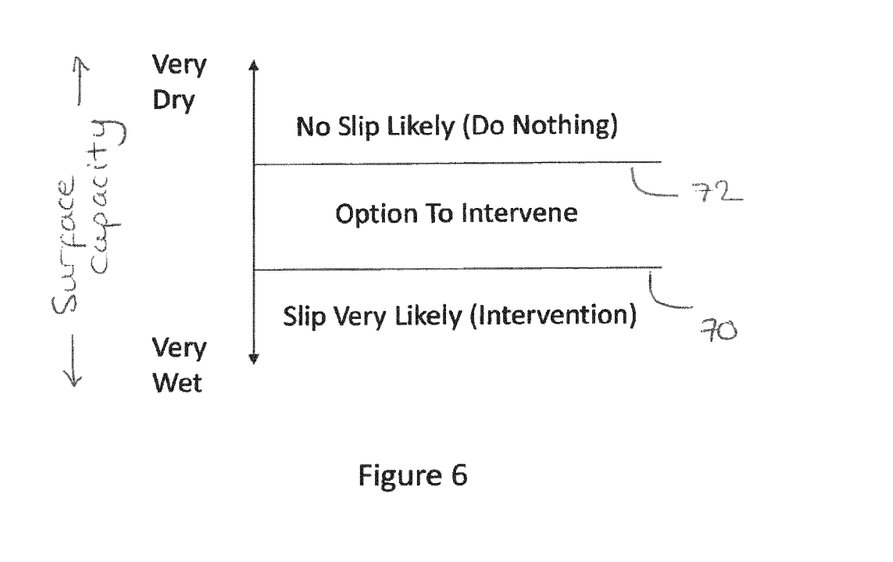
FIG. 6 is a graph to illustrate one embodiment of the invention in which threshold values are used to determine whether a demanded driver torque needs to be adjusted to control vehicle launch.

Referring also to FIG. 6, if it is determined that the terrain type or terrain characteristic falls within a band beneath a lower threshold 70 of surface capacity, corresponding to a very wet surface, then an output 62 is provided to the engine torque control system 37 to automatically modify (e.g. override) the driver demanded torque. If it is determined that the terrain type or terrain characteristic falls within a middle band corresponding to a moderate surface capacity, corresponding to a moderately dry surface, an output 62 is provided to give the driver the option to continue with manual control of the torque as the vehicle is launched, or to accept automatic control due to there being some risk of wheel slip and surface damage. If it is determined that the terrain type or terrain characteristic falls above a higher threshold 72 of surface capacity, then it is determined that it is safe for the driver to control the torque demand and no intervention or modification of the driver-demanded torque is required. It will be appreciated from FIG. 6 that the middle band falls within the thresholds 70, 72.

Using the process described with reference to FIG. 6, a determination can be made regarding whether it is advisable for the driver-demanded torque to be modified and/or whether an alert should be provided to the driver to warn them that the surface upon which the vehicle is about to be launched requires careful torque control to avoid wheel slip. The vehicle may be further provided with a facility (e.g. via the HMI) for the user to elect to receive such alerts, or whether they prefer automatic control to take over without their input in the event that a determination is made that the terrain is a low friction or deformable (e.g. water-logged) surface susceptible to damage at launch.

In another embodiment to that shown in FIG. 5, the input to the determination module 39 may come directly from the radar and acoustic sensors 12, 22, so that the vehicle launch system itself makes the determination of the terrain type, or the terrain characteristics. In this case the database 44 of the VCS and the database 60 of the determination module 39 may be combined in one and the same database which may be advantageous.

Some existing vehicles are provided with a system known as Advanced Terrain Progress Control (ATPC) which is a system designed to control progression of a vehicle over difficult terrains when travelling at low speeds, where it can be difficult for a driver to control and maintain the low speed of the vehicle safely and comfortably. ATPC systems differ from the present invention in that they are not capable of making a determination of the need for automatic control of the vehicle speed based on terrain characteristics and they require a driver to input information (e.g. that the terrain is of a particular type) for speed control to be implemented. A typical ATPC system is not therefore provided with sensors to provide the determination of the terrain type or characteristics automatically, and to respond automatically to that determination. If the present invention is implemented within a vehicle provided with ATPC, the two systems may be co-operable so that either the driver demand 45 is provided to the launch control module 33 (as shown in FIG. 2) or the output from the ATPC is provided to the launch control module 33, so that there is no requirement for the driver to assess whether automated vehicle launch would be advantageous.

In a vehicle provided with an ATPC system it will also be appreciated that the functionality of the torque control system 37 may also be combined with that of the ATPC system so that the systems form part of the same processing module.

If the surface characterisation determines at step 106 that the surface is not a low friction surface, at step 110 a check is made regarding whether the surface is a deformable surface. If it is determined that the surface is a deformable surface then, even if it is not a low friction surface, a control signal is sent by the launch control module 33 to the engine torque control system 37 to limit the torque demand signal as described above, again avoiding wheel slip and damage to the underlying surface which may further hinder a controlled launch.

If the surface characterisation determines that the surface is not a low friction surface, and nor is it a deformable surface, then at step 112 normal torque control ensues in accordance with the driver demand at the pedal. Otherwise, driver torque demand at the pedal is modified in dependence on the characteristics of the terrain which have been identified.

The process illustrated in FIG. 4 is initiated in the event of a suitable determination being made at step 102, by the determination module 35, that the vehicle is about to launch and a suitable indication signal being generated. For example a suitable indicator of launch may be a key being detected within the vehicle cabin, it may be an electronic or park brake being released, or it may be the rise of the rotary gear shift control (often referred to as ETS rise). Detection of the key fob for the vehicle approaching the vehicle may also be used as an indicator that vehicle launch is about to occur.

It will be appreciated that launch of a wheeled vehicle on saturated ground, such as extremely wet grass, can prove difficult as it is often critical to achieve a successful launch on the first attempt, with the minimum amount of wheel slip. Extremely wet grass is a very fragile, deformable surface, sensitive to excessive wheel slip, which can lead to the tyres breaking through the grass on the surface and becoming mired in the soft mud sub-layer beneath the grass. Disturbing the surface in this way makes further controlled movement of the vehicle along the surface even more difficult for the driver. Furthermore, if the vehicle is launched on rough or bumpy surface, the gentle pedal control required to ensure a well controlled launch may be difficult to achieve and accidental excessive pedal control is more likely to arise inadvertently. By over-riding the driver's pedal input control and providing a well controlled torque output to the wheels automatically, and in accordance with a pre-established schedule that is known to be suitable for the conditions, the disadvantageous effects described previously can be avoided.

In practice it is more likely that the ensuing torque control at launch is based only on the characteristic(s) of the terrain that is detected. However, it is also feasible that toque control is based not only on the terrain type, but on the character of the driver-demanded torque. For example, the profile of the demand torque from the driver may be modified by reducing the torque demand by a predetermined percentage.

It will be appreciated that although the use of radar and acoustic sensors enables an accurate surface characterisation of the terrain to be made (for example, grass, sand or snow), for the purpose of the aforementioned method it is only necessary to determine whether the surface is of low friction or deformable, and a full characterisation of the surface is not essential as it may be when the vehicle is travelling. A less sophisticated sensor system than that described previously may therefore be used for the terrain identification. In one embodiment, for example, it may be sufficient for the purpose of torque control at launch to use just one type of sensor (e.g. radar) to provide a characterisation of the terrain based only on friction or deformability.

To improve the robustness and accuracy of the surface characteristic determination it may be desirable to utilise both the radar and acoustic sensor (if provided) for full surface characterisation for the purpose of the VTRS, but for the purpose of powertrain control at launch a surface characterisation based only on one set of sensors may be used.

In a further alternative embodiment, the surface characterisation need not be derived from sensors on the vehicle but instead may be derived from a user input to indicate what they observe the terrain type to be. For example, the HMI may be configured to enable user input of the terrain type just prior to launch via a touch screen or microphone for receiving an audible user input. On entering the vehicle the display screen of the HMI may present the user with a query regarding the observed terrain type, so that once the user has entered the relevant indication (audibly or via other input means of the HMI) the engine torque control system is adjusted accordingly so as to modify the torque applied at the vehicle wheels, if necessary, as the vehicle pulls away. The HMI may allow the user to enter a particular terrain type (e.g. wet grass, ice) or it may allow the user to answer 'yes' or 'no' to the question 'is the surface wet?' or 'is the surface soft?'.

Other indicators of the nature of the terrain on which the vehicle is about to launch may be provided to qualify the indicator derived from the sensor data. For example windscreen wiper activity prior to launch, rain sensor activity prior to launch and/or whether the vehicle has a low range selection before launch may all be used to indicate that weather conditions are wet, and the surface of the terrain may be water-logged. The VTRS being in a mode that indicates grass or gravel or snow (e.g. TR response of GGS) surrounding the vehicle, and/or the vehicle being parked on a steep slope, and/or the ambient temperature being detected below a certain temperature, may also be used as indicators of the nature of the terrain surrounding the vehicle on which the vehicle is about to launch. Such indicators may be used to supplement the indication from the acoustic and/or radar sensor of the terrain type, to increase the likelihood of said indication being correct.

In another embodiment, the processing module 39 may be configured to determine whether the driver-demanded torque will result in wheel slip and, if it will not, then the driver-demanded torque is used in preference to the torque demand that is derived based on the terrain characteristic.

In a further alternative embodiment the engine torque control system may also be configured to receive an input from a tow sensor (not shown) to provide an indication of whether or not the vehicle is towing a trailer. In the event that the vehicle is towing a trailer, a further adjustment is made to the torque control output at vehicle launch to ensure the applied torque at the driven wheels is appropriate for both the surface characterisation of the terrain, and the towing load.

In addition, or as an alternative, if the vehicle is provided with a load sensor associated with the rear axle, the output from the load sensor may also be used to modify the torque output signal at vehicle launch so that an adjustment is made to the applied torque at the driven wheels in response to the load over the rear axle. For example, for an All Wheel Drive (AWD) vehicle, the torque split between the front and rear axles may be adjusted in dependence at least in part on the relative load across each axle and/or the orientation of the vehicle if parked on a steep slope.

It will be appreciated by a person skilled in the art that the invention could be arranged to take many alternative forms without departing from the scope of the appended claims.

The invention claimed is:

1. A vehicle launch control system for a vehicle, the system comprising:
   a sensor system comprising one or more vehicle-mounted sensors configured to receive a reflected signal from the terrain in the path of the vehicle; and
   an input for receiving an indication signal to indicate that vehicle launch is imminent, and further operable to automatically instruct the sensor system to determine a terrain characteristic of the terrain in the path of the vehicle if the indication signal is received, wherein the terrain characteristic includes a characterization of deformability of the surface;
   wherein the system is configured to, based on said determined terrain characteristic, determine whether the terrain characteristic is likely to result in an unwanted level of wheel slip if the vehicle is launched, and wherein the system is further configured to provide an output to indicate that an unwanted level of wheel slip will occur based on the outcome of the determination.

2. The vehicle launch control system as claimed in claim 1, further comprising either or both an input for receiving a driver-demanded torque to initiate vehicle launch and an input for receiving a control signal from a speed control system associated with the vehicle to initiate the vehicle launch.

3. The vehicle launch control system as claimed in claim 1, wherein the system is further configured to set the powertrain torque limit for a torque control system for providing a torque demand to the powertrain of the vehicle depending on the powertrain torque limit.

4. The vehicle launch control system as claimed in claim 3, wherein the torque control system is configured to modify a demanded torque in response to the set powertrain torque limit.

5. The vehicle launch control system as claimed in claim 4, wherein the modification comprises at least one selected from the following group: over-riding the demanded torque with a torque which avoids unwanted wheel slip for the determined terrain characteristic at vehicle launch; altering the demand torque to a lower value; applying a maximum limit to the demand torque so as to avoid unwanted wheel slip for the determined terrain characteristic at vehicle launch; and modifying the rate of increase in the torque applied at the driven wheels compared with the rate of increase in the demanded torque.

6. The vehicle launch control system as claimed in claim 4, wherein the demanded torque is a driver-demanded torque.

7. The vehicle launch control system as claimed in claim 1, wherein the terrain characteristic includes at least one selected from the following group: a characterization of the friction of the surface; a characterization of the water content of the surface; and a characterization of the roughness of the surface.

8. The vehicle launch control system as claimed in claim 1, wherein the sensor system includes at least two sensors mounted on the vehicle, the sensors including at least one acoustic sensor.

9. The vehicle launch control system as claimed in claim 1, wherein the terrain characteristic is derived from at least two sensors mounted on the vehicle, the sensors including at least one radar sensor.

10. The vehicle launch control system as claimed in claim 1, further including a launch detection module configured to determine whether the vehicle is about to launch and to generate the indication signal.

11. The vehicle launch control system as claimed in claim 10, wherein the launch detection module is further configured to receive a signal from a detection system to detect whether a key for the vehicle is present in a cabin of the vehicle.

12. The vehicle launch control system as claimed in claim 10, wherein the launch detection module is further configured to receive a signal from a brake system of the vehicle to indicate that the brake has been released ready for vehicle launch.

13. The vehicle launch control system as claimed in claim 1, further comprising an input for receiving an indication from a tow sensor relating to whether the vehicle is towing a trailer, the system being further configured to provide the output based also on the indication from the tow sensor.

14. The vehicle launch control system as claimed in claim 1, further comprising an input for receiving an indication from a load sensor of the load over the driven wheels, the system being further configured to provide the output based also on the indication from the load sensor.

15. A vehicle control system comprising the vehicle launch control system as claimed in claim 1 configured to control the torque applied at the driven wheels during vehicle launch, and a vehicle terrain response system configured to control the torque applied at the driven wheels during onward vehicle travel following vehicle launch.

16. A vehicle comprising the vehicle launch control system as claimed in claim 1.

17. A method of controlling launch of a vehicle, the method comprising:
   receiving an indication signal to indicate that vehicle launch is imminent;
   automatically determining, on the basis of sensor output data measuring a reflected signal from the terrain in the path of the vehicle, a terrain characteristic of the terrain in the path of the vehicle at vehicle launch if the indication signal is received, wherein the terrain characteristic includes a characterization of deformability of the surface;

determining whether the terrain characteristic is likely to result in an unwanted level of wheel slip if the vehicle is about to launch; and providing an output to indicate that an unwanted level of wheel slip will occur based on the outcome of the determination.

18. A computer program product executable on a processor so as to implement the method of claim 17.

19. A non-transitory computer readable medium carrying computer readable code which when executed causes a vehicle to carry out the method of claim 17.

20. A controller arranged to implement the method of claim 17.

* * * * *